United States Patent [19]

Peterson

[11] 4,073,788
[45] Feb. 14, 1978

[54] PARTIALLY IMIDIZED POLYAMIDE-ACID POLYMERS, AQUEOUS COATING COMPOSITIONS, COATED WIRE AND METHOD, AND PARTIALLY IMIDIZED INTERMEDIATE

[75] Inventor: Marvin A. Peterson, Fort Wayne, Ind.

[73] Assignee: General Electric Company, Fort Wayne, Ind.

[21] Appl. No.: 467,615

[22] Filed: May 6, 1974

Related U.S. Application Data

[63] Continuation of Ser. No. 822,899, May 8, 1969, abandoned, and a continuation of Ser. No. 324,987, Jan. 19, 1973, abandoned.

[51] Int. Cl.$^2$ .............................................. C08J 3/06
[52] U.S. Cl. ........................... 260/29.2 N; 260/78 TF; 260/326 C; 427/120; 428/458
[58] Field of Search .......... 260/29.2 N, 326 C, 78 TF

[56] References Cited

U.S. PATENT DOCUMENTS

| 3,078,228 | 2/1963 | Smith et al. | 260/326 C |
| 3,179,631 | 4/1965 | Endry | 260/78 TF |
| 3,242,128 | 3/1966 | Chalmers | 260/78 TF |
| 3,377,310 | 4/1968 | Serlin et al. | 260/78 TF |
| 3,511,807 | 5/1970 | Lovejoy | 260/78 TF |
| 3,804,793 | 4/1974 | McQuade | 260/29.2 N |
| 3,810,858 | 5/1974 | Boldebuck | 260/29.2 N |

FOREIGN PATENT DOCUMENTS

| 41-15417 | 8/1966 | Japan | 260/326 C |

Primary Examiner—Murray Tillman
Assistant Examiner—A. H. Koeckert
Attorney, Agent, or Firm—Joseph E. Papin

[57] ABSTRACT

The process for producing polyamide acid and polyimide polymers for use as coating materials by reacting an aromatic dianhydride reactant with an aromatic diamine reactant to produce a polyamide acid polymer wherein said reactants are present in approximately equal molar quantities, by utilizing the steps of forming an anhydrous mixture of an aromatic dianhydride reactant and an aromatic diamine reactant in an organic solvent wherein the reactants are in the molar ratio of about two-to-one, reacting said reactants at a temperature below that at which imidization occurs to form an amide acid intermediate having two free carboxyl groups each ortho to an amide group, and further reacting said amide acid intermediate with a reactant of the character of the original reactant initially present in the lesser amount with said additional reactant being in the molar amount equal to the molar amount of said lesser initial reactant thereby to form a polyamide acid polymer for use as a coating material. Additional steps may include the addition of a volatile ammonium base to produce a water soluble polyamide acid polymer and diluting the coating medium with water to form an aqueous-organic coating medium. The amide acid intermediate may be partially imidized and appropriate flow agents may be added. The coating medium is applied to a substrate to form a coating and the coating is cured to a polyimide form by the application of heat. The resulting product is a substrate with a polyimide coating.

36 Claims, 3 Drawing Figures

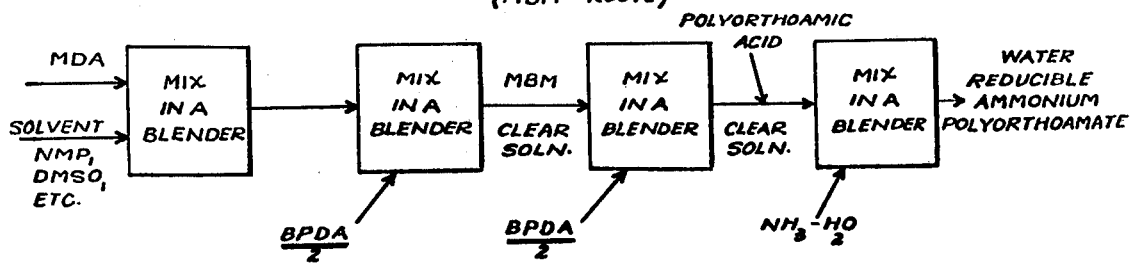
FIG.1 (MBM - ROUTE)
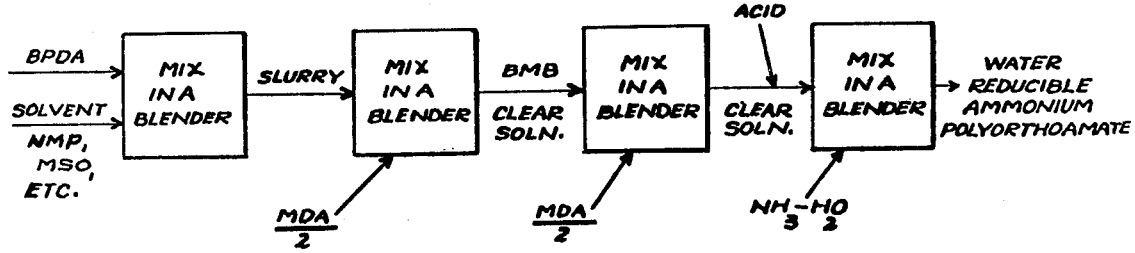
FIG.2 (BMB-ROUTE)
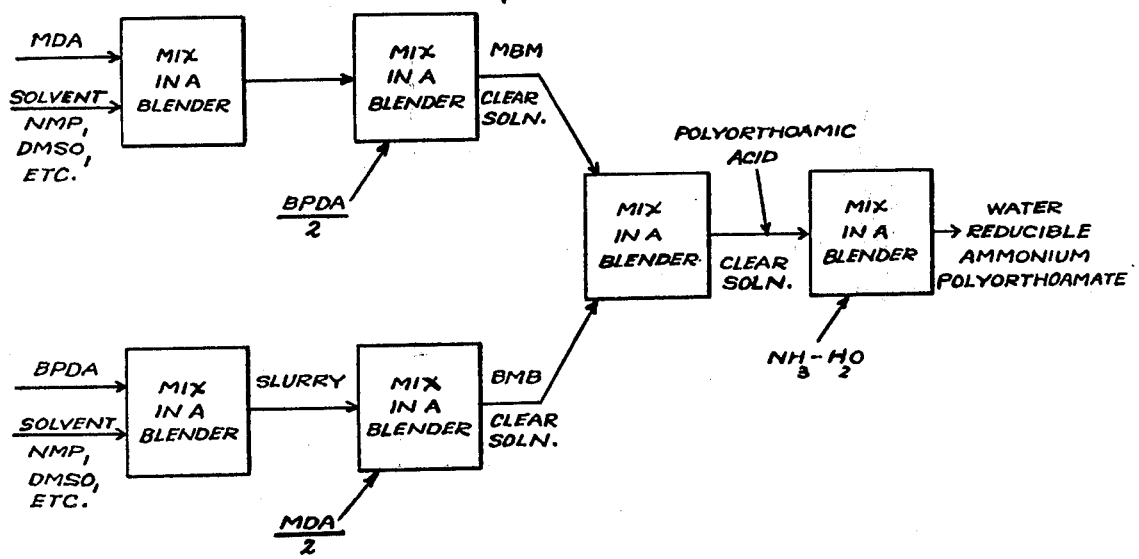
FIG.3 (MBM-BMB ROUTE)

PARTIALLY IMIDIZED POLYAMIDE-ACID POLYMERS, AQUEOUS COATING COMPOSITIONS, COATED WIRE AND METHOD, AND PARTIALLY IMIDIZED INTERMEDIATE

CROSS-REFERENCE TO RELATED APPLICATION

This application is a continuation of copending application Serial No. 822,899, filed May 8, 1969 by Marvin A. Peterson for "Improved Process for Producing Wire Coatings From Prepolymeric Materials ", now abandoned; and is a continuation of copending application Ser. No. 324,987, filed Jan. 19, 1973 by Marvin A. Peterson for "Process For Coating", now abandoned.

FIELD OF THE INVENTION

The present invention relates to a new and improved process for the preparation of polyamide acid and polyimide polymers. Such polymers find particular but not necessarily exclusive utility as insulating coatings on magnet wire and the like.

BACKGROUND OF THE INVENTION

The advantages of synthesizing insulation coatings for magnet wire from aromatic dianhydride and aromatic diamine materials are known in the prior art. The techniques for such synthesis, however, have not always yielded consistent reaction product materials. Moreover, the starting materials comprised of the aromatic dianhydrides and aromatic diamines, as well as the polyamic acid produced therefrom are apt to be difficult to store and require solvent materials which are expensive and generally are dangerous pollutants which must be disposed of during the coating process. Until recently, the polymeric materials exhibited such water sensitivity that they were considered to be generally nonstorable for any significant period of time. One solution now available for that particular problem is disclosed in my copending application titled, "Improved Process for Producing Coating Materials," U.S. application Ser. No. 803,037, filed Feb. 27, 1969, now abandoned, and invented by Marvin A. Peterson, which is assigned to the same assignee as the present invention.

It is known, that for magnet wire insulation purposes, or surface coatings in general, superior coatings are obtained by utilizing the highest possible molecular weight of polymer and by utilizing polymers which are characterized by consistent and uniform molecular weights. When low molecular weight entities are present, they are generally lost during the cure.

A further technical problem which has proved difficult to solve, entails the necessity for obtaining a preferred viscosity and solids/solvent ratio of the coating material solution at the time it is applied to the magnet wire. These parameters of wire coating operation have proven difficult to control and even more difficult to optimize for a given wire coating operation in order to achieve both ideal coating rate of application and a superior enamel insulation in the finished product. Presently known coating compositions cannot be generally relied upon to provide consistently the functional and compositional requirements for wire coating operation as well as a satisfactory insulation coating.

OBJECTS OF THE INVENTION

It is the principal object of this invention to provide a new and improved process for producing polyamic acid polymers which find particular but not exclusive utility in the formation of polyimide enamel insulation coatings on magnet wire. More specifically, it is an object of the present invention to produce such polyamic acid polymers through the preparation of a novel intermediate reaction product which is storable and readily facilitates control of the structure and composition in the formation of the fully polymerized polyimide wire enamel.

A further object of the present invention is to provide a process for producing the reaction product of aromatic anhydride and aromatic amine by means of which the product can be more readily imidized to a preferred amount, thereby to facilitate more precise control of the viscosity of the polyorthoamic acid-imide at the time the coating material is applied to the magnet wire. More specifically, it is an object to achieve the desired imidization without depolymerization of the desired polymer.

It is a still further object of the present invention to provide an improved method for making polyimide magnet wire enamel insulation coatings from aromatic anhydrides and aromatic amines wherein the polymer includes a variety of anhydrides and aromatic amines forming a homogenously mixed polyimide to provide the desired physical properties of the wire enamel.

A further object of the present invention is to reduce the loss of the aromatic dianhydride and aromatic diamine reactants and polymer formed therefrom in the wire coating tower.

Still a further object of the present invention is to produce a uniform polymer molecular weight in the finished polyimide with the molecular weight of the polymer falling within a narrow range of relatively high molecular weight number. Still another object is to produce a magnet wire insulation of uniformly high-quality which does not vary substantially either during the coating operation or from one coating operation to the next.

Other objects, advantages and features will become apparent from the following description which proceeds with reference to the accompanying drawings.

SUMMARY OF THE INVENTION

In the present invention, I propose an entirely new tack by varying the order and technique of synthesis of the coating material. In a general sort of way, assuming that an aromatic dianhydride is represented by the letter (Y), and an aromatic diamine is represented by the letter (X), I have unexpectedly found that stable precursor compounds of definite composition can be formulated in suitable solvents and comprised of molecular structures of a form either XYX or YXY, and an polyorthoamic acid may then be formulated by adding either (Y) to the XYX solution, or by adding (X) to the YXY solution. It is also possible to zip up or further polymerize XYX units with YXY or vice versa. Many useful results follow from this procedure. For example, where the YXY material is a dianhydride-diacid-diamide I can easily control the degree of imidization by controlling the period and degree of heating of the solution of the YXY precursor polymeric material. By using such small prepolymeric units, imidization is a more controllable reaction and I can thereby obtain a considerable degree of control in the viscosity of the coating solution. I can also form mixed polymers by adding other prepolymer units of different compositions which may be designated X′ Y X′ or Y′ X Y′ or XY′X or YX′Y and then blend these materials to secure a homogenous mixed prepolymer.

A further advantage is that the preformed stable structural units, of either the XYX or YXY unit, make it possible to form much longer and more uniform molecular chains of greater molecular weight with a relatively low degree of polydispersity when the (X) or (Y) is added to complete the formation of the finished molecular product. The formation of final polymer in the smaller XYX or YXY units puts in the hands of the formulator a useful and versatile formulating technique by which the molecular weight of the finished product, the consistency of the final product, its viscosity, solids/solvent ratio, and mixed polymer composition formulation are more readily variable to meet a particular coating requirement.

DESCRIPTION OF THE DRAWINGS

FIG. 1 is a schematic flow diagram illustrating one process embodying the present invention.

FIG. 2 is a schematic flow diagram illustrating an alternative process embodying the present invention.

FIG. 3 is a schematic flow diagram illustrating still a further alternative process embodying the present invention.

DESCRIPTION OF THE INVENTION

In accordance with the present invention, an aromatic dianhydride and an aromatic diamine are combined and reacted in the molar ratio of approximately two-to-one to form an intermediate or precursor material which is either a diorthoamic acid dianhydride or a diorthoamic acid diamine, in a suitable solvent. The aromatic dianhydride reactant is generally of the formula

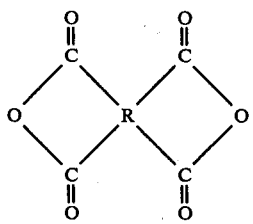

wherein R is a tetravalent radical containing at least one ring of six carbon atoms and having benzenoid unsaturation, the four carbonyl groups being attached to different adjacent carbon atoms, while the aromatic diamine is of the formula $H_2N—R'—NH_2$, wherein R' is a divalent aromatic radical. The intermediate reaction product thus formed is further polymerized or "zipped-up" by reaction with a further amount of the reactant or equivalent the lesser molar amount to produce a polyimide prepolymer consisting of recurring units of the formula:

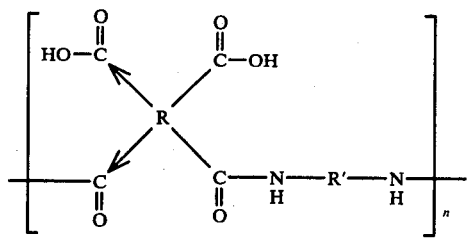

wherein R and R' have the above identified meanings, the arrows indicate isomerism, and n is an integer of 10 to 1000.

Before final polymerization, the intermediate can be partially imidized through intramolecular reaction by controllably heating the intermediate at approximately 90 degrees centigrade thereby forming stable partially imidized units which upon "zipping up" or polymerization form the following:

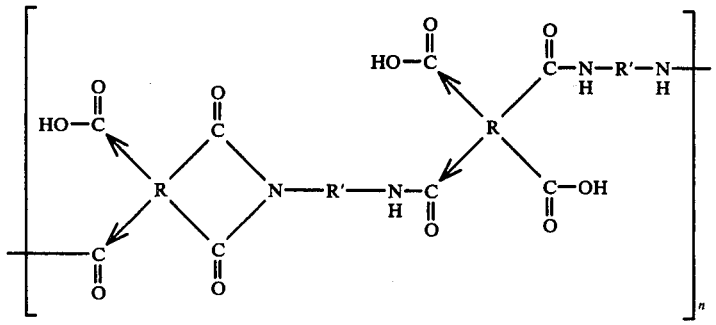

wherein the components are as identified above.

AROMATIC DIANHYDRIDE REACTANT

The aromatic dianhydrides that are useful in the process of this invention are those having the formula

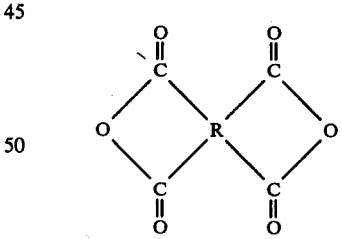

wherein R is a tetravalent radical containing at least one ring of 6 carbon atoms and having benzenoid unsaturation, each pair of carboxyl groups being attached to different adjacent carbon atoms. These dianhydrides include, for example, pyromellitic dianhydride (PMDA); 2,3,6,7-naphthalene tetracarboxylic dianhydride; 3,3'4,4'-benzophenonetetracarboxylic dianhydride (BPDA) benzene-1,2,3,4-tetracarboxylic dianhydride; bis(3,4-dicarboxylphenyl) sulfone dianhydride; bis(3,4-dicarboxyphenyl) methane dianhydride; bis(2,3-dicarboxyphenyl)methane dianhydride; 2,6-dichloronaphthalene-1,4,5,8-tetracarboxylic dianhydride; 2,7-dichloronaphthalene,4,5,8-tetracarboxylic dianhydride; 2,3,6,7-tetrachloronaphthalene-1,4,5,8-tetracarboxylic dianhydride; naphthalene-1,4,5,8-tetracarboxylic dianhydride; naphthalene-1,2,4,5-tetracarboxylic dianhydride; 3,3',4,4'-diphenyltetracarboxylic dianhydride; 1,2,5,6-naphthalenetetracarboxylic dianhydride; 2,2',3,3'-diphenyltetracarboxylic dianhydride; 2,2-bis(3,4-dicarboxyphenyl) propane dianhydride; 3,4,9,10-phenylenetetracarboxylic dianhydride; bis(3,4-dicarboxyphenyl) ether dianhydride; 2,2-bis(2,3-dicarboxyphenyl)propane dianhydride; 1,1-bis(2,3-dicarboxyphenyl)ethane dianhydride, 1,1-bis(3,4-dicarboxyphenyl)ethane dianhydride; and the like.

ORGANIC DIAMINE REACTANT

The organic diamines that are useful in the process are those having the formula
$$H_2N-R'-NH_2$$
wherein R' is a divalent radical selected from the class consisting of

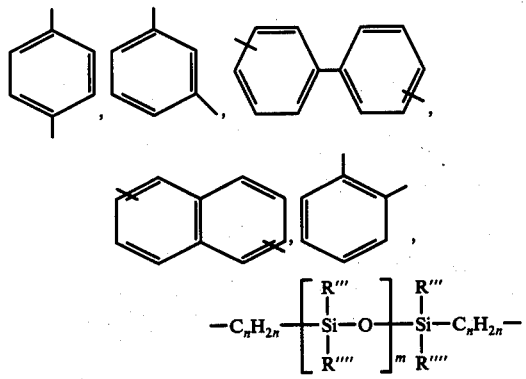

wherein R''' and R'''' are an alkyl or an aryl group having 1 to 6 carbon atoms, $n$ is an integer of from 1 to 4, and $m$ has a value of 0, 1 or more, and

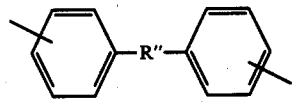

wherein R'' is selected from the group consisting of an alkylene chain having 1-3 carbon atoms,

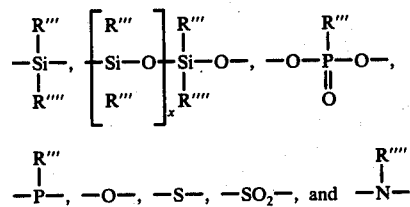

wherein R''' and R'''' are as above-defined and $x$ is an integer of at least 0.

Specific diamines which are suitable for use in the present invention are: meta-phenylene diamine (mPDA); para-phenylene diamine; 4,4'-diamino-diphenyl propane; 4,4'-diamino-diphenyl methane; benzidine; 4,4'-diaminodiphenyl sulfide; 4,4'-diamino-diphenyl sulfone; 3,3'-diamino-diphenyl sulfone; 4,4'-diamino-diphenyl ether; 2,6-diamino-tyridine; bis-(4-amino-phenyl) diethyl silane; bis-(4-amino-phenyl)phosphine oxide; bis-(4-amino-phenyl)-N-methylamine; 1,5-diamino naphthalene; 3,3'-dimethyl-4,4'-diamino-biphenyl-3,3'-dimethoxy benzidine; m-xylylene diamine; p-xylylene diamine; 1,3-bis-delta-aminobutyltetramethyl disiloxane (ABTS); 1,3-bis-gamma-aminopropyltetraphenyl disiloxane; and mixtures thereof.

SOLVENT

The solvents useful in the solution phase of this invention are the organic solvents whose functional groups do not react with either of the reactants (the diamines or the dianhydrides) to any appreciable extent. Besides being inert to the system and preferably, being a solvent for the polyamide acid, the organic solvent must be a solvent for at least one of the reactants, and preferably for both of the reactants. The organic solvent is an organic liquid other than either reactant or homologs of the reactants, that is a solvent for at least one reactant, and contains functional groups, the functional groups being groups other than monofunctional primary and secondary amino groups and other than the monofunctional dicarboxylanhydro groups. Such solvents include dimethylsulfoxide; N-methyl-2-pyrrolidone (NMP); the normally liquid organic solvents of the N,N-dimethylmethoxyacetamide; N-methylcaprolactam; and like solvents. Also, tetramethylene urea; pyridine; dimethylsulfone; hexamethylphosphoramide; tetramethylene-sulfone; formamide N-methylformamide, butyrolactone; or N-acetyl-2-pyrrolidone. The solvents can be used alone, as mixtures, or in combination with poor solvents such as benzene, toluene, cresylic acid, xylene, dioxane, cyclohexane, or benzonitrile.

It is important in the process of this invention that the reactants and the solvents be essentially anhydrous during the initial condensation reaction in order to prevent hydrolysis of the dianhydride to its acid form which acts as an impurity which lowers the molecular weight.

The present invention is not restricted to the use of a particular aromatic anhydride or a particular aromatic diamine. For convenience in illustration, however, specific reference may be made to the reaction of 3,3',4,4' benzophenone tetracarboxylic dianhydride, which is abbreviated "BPDA" or sometimes just "B", and 4,4' methylenedianiline which is abbreviated "MDA" or sometimes just "M". These reactants may be reacted together, following the teachings of the invention, to form a polyamic acid polymer, having a desired molecular weight, purity and degree of imidization, in a coating solution of a desired viscosity.

To illustrate the present invention, an aromatic anhydride and aromatic amine or reacted together in approximately the molar ratio of two-to-one (2/1). For example two moles of the aromatic anhydride, 3,3' 4,4'-benzophenonetetracarboxylic dianhydride (B) having the formula

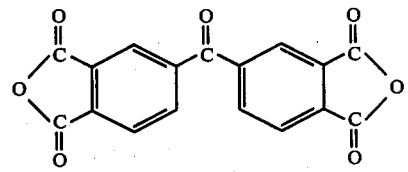

are reacted with one mole of the aromatic diamine 4-4'-methylenedianiline (M) having the formula

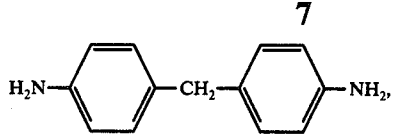

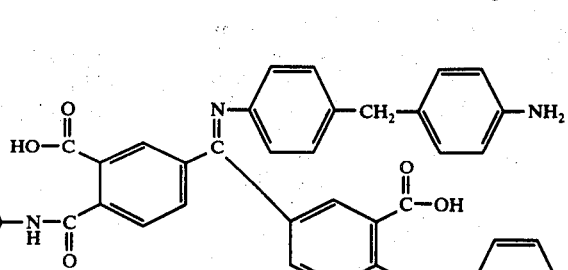

are reacted in N-methyl-2-pyrrolidone solvent to produce a reaction product having the formula

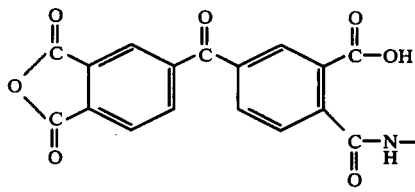 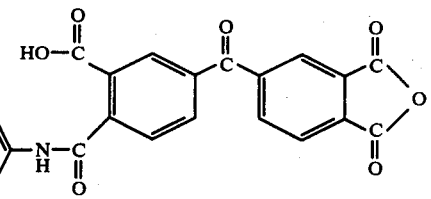

This material, a "precursor prepolymeric material", is known as a dianhydride diacid diamide, and may be expressed by the shorthand formula "BMB." The precursor prepolymeric material is a stable compound, is storable and can be readily further reacted, as will be described, to form a high molecular weight polyorthoamic acid. Additionally, the material can, if desired, be heated controllably to effect a desired degree of imidization. When such BMB is partially imidized, there is an intramolecular reaction which occurs between the acid portion of the BMB molecule and the hydrogen atom of the amide to produce the following molecule (assuming a 50 percent imidizaton):

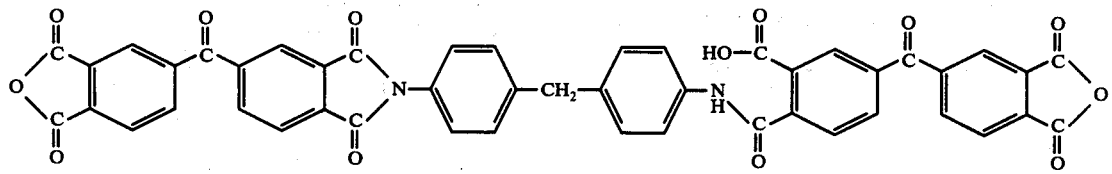

This molecular structure is known as a dianhydride imide acid amide.

I can also produce prepolymeric materials utilizing two moles of M for each mole of B. The product produced would be represented by the formula

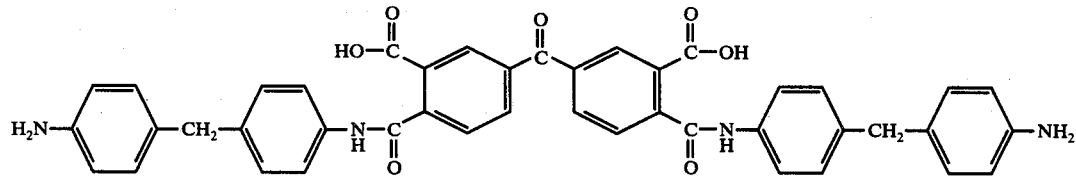

which, for convenience may be abbreviated as "MBM." The foregoing product is known as a diamine diacid diamide.

I generally prefer to form the precursor in the form of BMB because the B is obtainable in powder form and is hydrolyzable so that it is preferred to solubilize or slurry the B under inert atmosphere in a suitable solvent, such as N-methyl-2-pyrrolidine or dimethylsulfoxide, these being only two examples of acceptable solvents. The M is a granular product which is more easily added to the reaction without protection than is the B. I further found, that in solutions of MBM, there tends to form a ketimine wherein the M reacts with a carbonyl of the B to produce the following reaction product:

The formation of ketimine may or may not be desirable, and it can be minimized in the BMB route.

Exhaustive testing of flexibility, toughness, dielectric strength, concentricity, heat resistance, abrasion resistance, cut through and the like are related to the ability to form high molecular weight polyimide enamels having a narrow range of molecular weights. One of the substantial advantages of the present invention is that I can achieve just those results in the finished product, by slowly adding M to BMB precursor prepolymeric material solution or by adding B to an MBM solution, these reactions being represented by:

(1) $nBMB + nM \rightarrow \{BMBM\}_n$        (1)

(2) $nMBM + nB \rightarrow \{MBMB\}_n$        (2)

The resulting polymer made in accordance with the described procedure is of higher molecular weight than heretofore obtainable and tends to have a narrow molecular weight distribution in accordance with the values indicated in Table 1.

TABLE I.

Molecular weight and polydispersity of polyimide prepolymers in accordance with the present invetion as determined by gel permeation chromatography:

| Sample No. | Description of Polymer System | η inh (dl./gm.) | $\overline{A}_n$ (Angstroms) | $\overline{A}_w$ (Angstroms) | MWD |
|---|---|---|---|---|---|
| 1 | BMB made to M/BMB = 1.016/1.000 | 0.60 | 18,596 | 47,815 | 2.6 |
| 2 | Sample No. 1 + NH$_3$ + H$_2$O, pH = 6.7 | — | 26,518 | 51,277 | 1.9 |
| 3 | Sample No. 1 12% imidized | — | 20,672 | 39,867 | 1.9 | where $\eta_{inh}$ is the inherent viscosity in dl./gm. evaluated in N-methyl-2-pyrrolidone at 37.8° C.

$\overline{A}_n$ and $\overline{A}_w$ are number average and weight average molecular weights, respectively, expressed in terms of chain length in Angstroms and MWD = $\overline{A}_w/\overline{A}_n$ = measure of the polydispersity of the system.

I believe that these features are the result of the greater mobility of the structural BMB molecules in the solution as compared with higher molecular weight precursor polyamic acid materials. Further, when the M is added (slowly) to the BMB solution, the reaction is exothermic; but the heating is controlled by means of a jacketed reaction vessel, and the agitators can also be cooled if desired. Thus I have substantiated from actual testing of molecular weights of the BMB synthesis route that an average molecular weight of polyorthoamic acid is attainable in the chain length range of 2 to 20 × 10$^4$ Angstroms and the relatively narrow distribution of molecular weight or polydispersity range of 1.9 to 5.7.

In the process of producing the prepolymeric material MBM, polyimide prepolymers can be prepared having up to 70 percent by weight solids/solvent ratio. There are no limits to the solids level of the preparation except that the apparatus used for effecting the mixing of the materials tends to become prohibitively expensive and impractical. Referring to the drawings, in FIG. 1 the ammonium polyorthoamate polyimide prepolymer is prepared by first mixing MDA in its solvent NMP or the like. One-half of the BPDA is then added to form MBM, a precursor material, and the final molecular weight and polydispersity of the prepolymer is achieved by adding the remaining BPDA, either as a powder or in solution form, to yield a high solids level polyorthoamic acid. The polyorthoamic acid is next treated with ammonia to produce ammonium polyorthoamate, a stable water reducible prepolymeric material. During these stages the times, concentrations and temperatures are regulated to achieve the viscosity, molecular weight, and concentrations (solids/solvent ratio) appropriate to the coating. Such parameters as time, temperature and concentration are disclosed in the examples set forth below. In FIG. 2, the order of addition of BPDA and MDA are reversed and the MDA is added in half-portions at separate steps.

I have prepared the polyamide prepolymer at solids levels in excess of 70% using a mortar and pestle, and then reacted the prepolymer with ammonia. I have found that in a GE household blender, for example, the practical solids level is 35–37%; above this level the blender motor will burn out due to the high viscosity of the solution. In addition, in a 3 × 5 3-roll mill the practical solids level is 37–40%; in a production type 3-roll mill size 5 × 12, it is 45–50%. The latter solids level can likewise be handled in certain vertical mixers, e.g., the Regal mixer manufactured by J. H. Day Co. The solids level may be further increased to the range of 70% by the use of movable arm mixers when this order of concentration of reactants is desired.

The temperature at which the initial condensation reaction of the dianhydride and the diamine is carried out is preferably below 80° C. in order to obtain negligible imidization of the polymer, a level subsequently stabilized by the addition of the nitrogen containing base. The particular temperature below 80° C. that must not be exceeded for any particular combination of diamine, dianhydride, solvent and reaction time to provide an essentially 100 percent polyamic acid polymer will vary but can be determined by a simple test by any person of ordinary skill in the art. However, for most purposes it has been found that temperature should be maintained preferably below 50° C.

The ratio of the reactants, i.e., the dianhydride and diamine, starts out in the ratio of 1/0.5 with the remainder being added to a ratio 1/1. Deviation from the 1 to 1 molar ratio should not be greater than 1.05 to 1, to 1 to 1.05 if polyimide polymers which will form good polyimide films are to be obtained. It is preferred to employ the diamine in a slight excess in order to obtain a polymer terminated with —NH$_2$ groups rather than an anhydride group which could hydrolyze to an acid group. Where the polymer is terminated with —NH$_2$ groups, the resulting polyamide film has good metal adhering qualities and excellent dielectric properties. Where the polyamide prepolymer has acid groups at either or both ends of the chain, the film reacts with the metal upon which it is coated and the electrical insulating properties are rather poor.

In many instances, it is desired to control the viscosity of the coating material at a preferred weight/solvent ratio. The ideal coating solution in most instances is one of approximately 17 percent solids and a viscosity of approximately 2500 cps. This can be accomplished by controllably imidizing the BMB dianhydride-diacid-diamide to an amide-imide-acid-dianhydride through heating of the material from 90 to 110 degrees centigrade until a preferred percent of imidization has taken place as determined by a titration procedure for residual carboxylic acid. The partially imidized dianhydride-imide-acid-amide may then be blended with an additional amount of non-imidized BMB to obtain the preferred viscosity at the desired concentration of prepolyimide coating material. There is the relationship between the imidization and viscosity in accordance with the following Table II:

TABLE II

| Imidization (%) | Solids (%) | Viscosity at 23 C. (cps) |
|---|---|---|
| 0–2 | 38.3 | 36,650 |
| 14–15 | 37.8 | 1,200 |
| 29–30 | 39.2 | 610 |
| 54–56 | 42.8 | 445 |

The controlled imidization described does not affect the molecular weight of the product and heating can be safely undertaken without depolymerization, which occurred when heating efforts were made to effect imidization of polyorthoamic prepolymer materials of greater molecular length than the BMB percursors. The imidized or partially imidized MBM or BMB materials ranging up to 55 percent imidization are soluble in the mother liquor and are convertible to the ammonium form and are thereafter dilutable with water for the final coating operation.

In place of adding MDA or BPDA a modifying material such as is shown in Table III may be added in the indicated mole percent.

TABLE III

| Modified portion | Modifying material | Mole (%) | Mode of syn. |
|---|---|---|---|
| MDA | ODA | 3 | BMB |
| MDA | ODA | 10 | BMB |
| MDA | mPDA | 3 | BMB |
| MDA | mPDA | 10 | BMB |
| MDA | TTA | 3 | BMB |
| MDA | TTA | 10 | BMB |
| MDA | DDS | 3 | BMB |
| MDA | DDS | 10 | BMB |
| MDA | ABTS | 3 | BMB |
| MDA | ABTS | 10 | BMB |
| BPDA | PMDA | 3 | MBM |
| BPDA | PMDA | 10 | MBM |
| BPDA | CPDA | 3 | MBM |
| BPDA | CPDA | 10 | MBM |
| MDA | ODA | 3 | BMB |
| MDA | ODA | 10 | BMB |
| MDA | mPDA | 3 | BMB |
| MDA | mPDA | 10 | BMB |
| MDA | TTA | 3 | BMB |
| MDA | TTA | 10 | BMB* |
| MDA | DDS | 3 | BMB |
| MDA | DDS | 10 | BMB |
| MDA | ABTS | 3 | BMB |
| MDA | ABTS | 10 | BMB |
| BPDA | PMDA | 3 | MBM |
| BPDA | PMDA | 10 | MBM |
| BPDA | CPDA | 3 | MBM |
| BPDA | CPDA | 10 | MBM |

*Though a clear polymer solution was formed at the 3 mole % level, crystals, presumably of TTA, appeared on standing in the 10 mole % level indicating an upper level between 3 and 10%.

From table III it can be seen that modification and mole percent may range considerably together with the percent of imidization to control the final coating properties. The workable concentration by weight of raw material solids in an organic solvent is approximately 45 percent on a 5 × 12 inch three roll mill and approaches 50 percent in the "one gallon" Regal mixer if the reaction temperature is controlled at about 25 degrees centigrade.

mellitic dianhydride sometimes referred to as "PMDA" or "P" having the structure

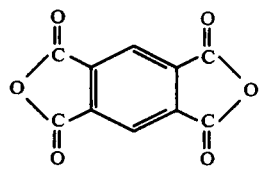

and 4,4'-oxydianyline, sometimes referred to as "ODA" or "O" having the molecular structure

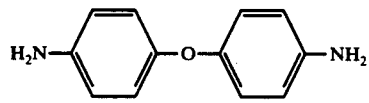

which, when combined together in the molar ratio of two moles PMDA plus one mole ODA provides:

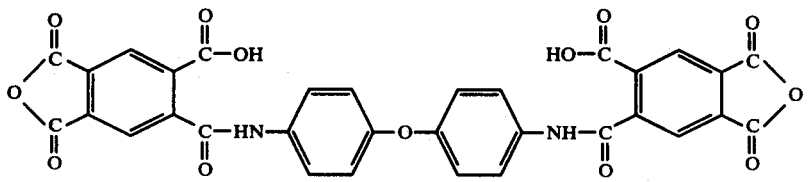

which precursor polymeric material may be identified as "POP." Thus, it is possible to combine BMB and POP precursors which can then be linked together by the addition of either M or O, or mixtures of both, to yield preferred percentages of each prepolymeric unit. I can also substitute replacement aromatic dianhydride atoms for the BPDA or replacement aromatic diamines for the MDA. Examples of such substitutions are: 2,4,6-triamino-1,3,5-triazine (TTA) having the formula

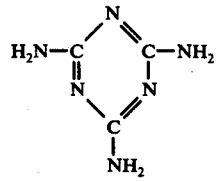

which can substitute for the M in the BMB precursor. For example:

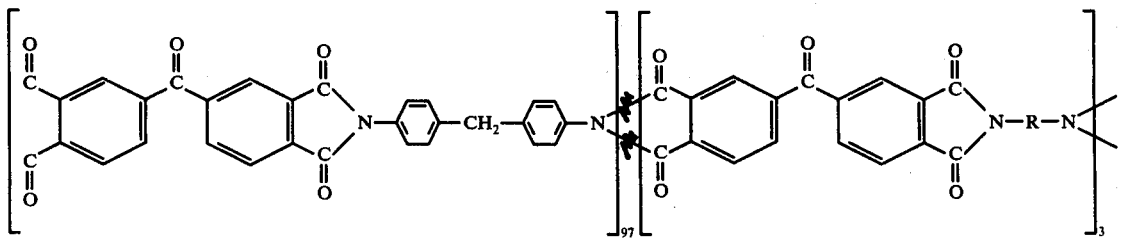

It is sometimes advantageous to blend with the MBM controlled amounts of other linear difunctional amines and anhydrides such as the reaction product of pyrowherein R' is representative of the diamine and may be as defined above, and the dianhydride may be partially substituted in accord with the following:

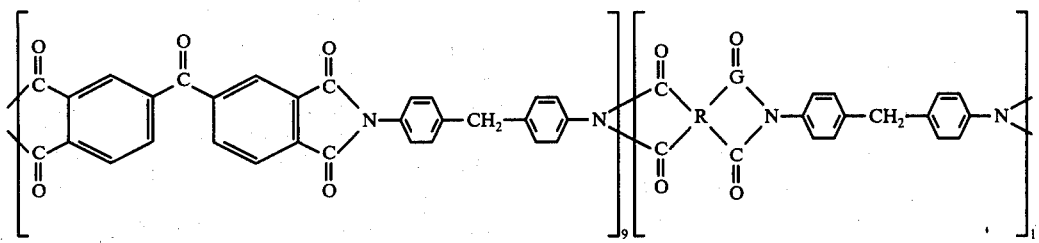

wherein R is as above defined. Since the degree of polymerization is well above 10, it is possible to have virtually all macromolecules of the 10% level of substitution with at least one MDA or BPDA replaced. It should be understood that only slight changes in structure can suffice to disturb the packing of polymer chains when the solvent is removed to effect a change in physical and functional properties.

Other aromatic diamines which may be substituted include 4,4'-sulfonyldianiline (DDS) having the formula

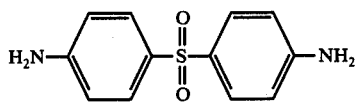

Other dianhydrides include 1,2,3,4-cyclopentane-tetracarboxylic dianhydride (CPDA) having the formula

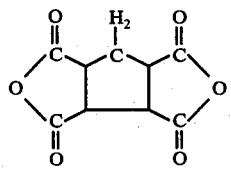

The relatively higher inherent viscosities for polymers modified with TTA and PMDA both highest at the 3 percent versus the 10 percent level, is explainable on the basis of some cross-linking ability of TTA and linking ability of PMDA, the latter being inflexible relative to BPDA. By controlling both imidization and substitution, the higher solids coating composition at acceptable viscosity levels are attainable thus requiring a fewer number of passes for a given degree of coating on the surface of the magnet wire; and, since less solvent is required, there is a consequent reduced solvent loss which is an important factor of economy. The very fact that I can introduce parameters which can control the degree of viscosity is itself a valuable fabricating tool.

The relationship of imidization and substitution to kinematic viscosity is summarized in Table IV for the BPDA-MDA polymer:

TABLE IV

| Modified Portion | Modifying Material | Mole (%) | Imid (%) | Viscosity (Cps) | Solids (%) |
|---|---|---|---|---|---|
| none | none | — | 7.86 | 16,280 | 30.8 |
| MDA | ODA | 3 | 7.45 | 12,600 | 30.4 |
| MDA | ODA | 3 | 20.0 | 16,500 | 30.4 |
| MDA | ODA | 10 | 6.85 | 17,950 | 30.6 |
| MDA | ODA | 10 | 19.0 | 20,000 | 30.6 |
| MDA | TTA | 3 | 0.63 | 31,300 | 28.6 |
| MDA | TTA | 3 | 15.4 | 45,500 | 28.6 |
| MDA | TTA | 10 | 12.2 | 5,670 | 27.8 |
| BPDA | PMDA | 3 | 7.52 | 28,120 | 25.6 |
| BPDA | PMDA | 10 | 8.61 | 10,680 | 25.0 |
| BPDA | CPDA | 3 | 8.55 | 9,450 | 25.4 |

TABLE IV-continued

| Modified Portion | Modifying Material | Mole (%) | Imid (%) | Viscosity (Cps) | Solids (%) |
|---|---|---|---|---|---|
| BPDA | CPDA | 10 | 10.8 | 1,600 | 25.3 |

It will be noted from Table IV that a wide viscosity range is possible at a given solids level by substitution and imidization.

The degree of imidization is determined by titrating for a determination of the number of carboxyl groups; any acceptable titration technique is acceptable, but that which I generally utilize is titration of the carboxylic acid groups in pyridine with t-butyl ammonium hydroxide in methanol to a thymol blue end point.

Once a particular viscosity and molecular weight for the prepolyimide are optimized, the polyamide prepolymer is treated with a volatile base ammonium hydroxide to convert the prepolymer to the ammonium salt of the polyorthoamic acid to form recurrent units having the formula:

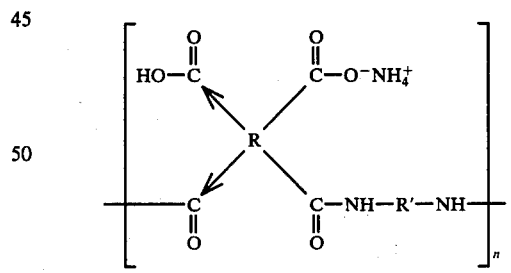

In this form the polyimide prepolymer is water soluble so that a substantial portion of the organic solvent can be replaced by water. For further details of this step reference may be made to my above-identified copending application Ser. No. 803,037 for "Improved Process for Producing Coating Materials". The water base coating solution is then applied to a substrate such as an electrically conductive wire, and the polyamide acid coating is converted to a polyimide coating on the base structure by heating to a temperature of from 100 degrees centigrade to 500 degrees centigrade, to produce a finished polyimide polymer having recurring units of the formula

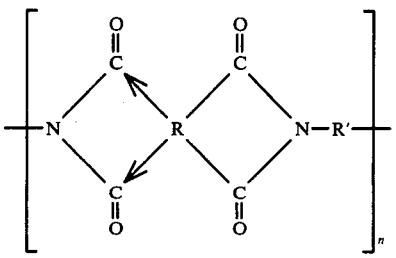

In order that those skilled in the art may better understand how the invention may be practiced, the following examples are given by way of illustration and not by way of limitation. All parts are parts by weight unless otherwise expressly set forth.

EXAMPLE 1

A J. H. Day Co. Regal, vertical high-rate-of shear mixer was flushed with dry nitrogen, dewpoint −65° C. To the mixer was charged 1738 gm. of dry N-methyl-2-pyrrolidone (<0.01% water), followed by 579.6 gm. (1.800 moles) of purified 3,3',4,4'-benzophenonetetracarboxylic dianhydride, (B), (>99.5% purity). This was stirred for about one minute. Then, 178.5 gm. (0.900 mole) of p,p'-methylene dianiline, (M), (>99.7% purity) was added and the stirring continued for several minutes forming a "BMB" precursor. Cooling water was flushed through the mixer to maintain a 35° C. maximum exotherm temperature and to return the temperature of the precursor system to 25° C. Finally, 182.0 gm. (0.918 mole) of p,p'-methylene dianiline, (>99.7% purity) was added and mixing continued for one hour with the exotherm again controlled at a maximum of 35° C. and the polymer system eventually maintained at 25° C. After the polymer was formed, 220 gm. of 28% ammonium hydroxide was added to the Regal mixer while maintaining further mixing. After a few minutes 2000 gm. of distilled water was added and the system stirred for about one hour. The system has a viscosity of 640 cps. It had a solids level of 20.4% as the ammonium polyorthoamate and a solids level of 17.9% when fully cured to the polyimide. This material was employed in the form of the ammonium polyorthoamate to coat copper and aluminum wire and cured to the polyimide form with laboratory simulated wire tower procedure. It was found on curing to pass 1 and 2× at 25% elongation at a 6-pass film build of about 3.0 mil on the diameter.

EXAMPLE 2

The polymer produced according to Example 1 was mixed with a "flow agent-surfactant" in the following manner: 0.7% by total system weight of a conventional nonionic, nonylphenolethylene oxide adduct was incorporated, and the formulated material employed as an enamel to coat copper and aluminum wire in a conventional wire enameling tower. The coating was found to pass 25% elongation and 1-2× flexibility.

EXAMPLE 3

The polymer system of Example 1 was mixed with a cresylic acid-phenol blend and n-butyl alcohol in the following manner: a mixture of these two ingredients was added to the polymer system of Example 1 in an amount such that each was present to the extent of 6% by weight of the total system. The formulated material was employed as an enamel to coat copper and aluminum wire in a conventional wire enameling tower. The coating was found to pass 25% elongation and 1-2X flexibility. Burnout test data, obtained as described below, for this enamel on copper is shown in Table V in comparison with wire from commercially available polyimide enamels (DuPont Type I and Type II ML) and polyamide-imide (AMOCO AI235).

TABLE V

Twisted Pair Burnout Test to Compare Three Kinds of Magnet Wire Enamel

| Enamel* | Sample | Time to Failure |
|---|---|---|
| I | 1 | 20 Seconds |
| I | 2 | 18 Seconds |
| I | 3 | 21 Seconds |
| I | 4 | 18 Seconds |
| I | 5 | 20 Seconds |
| II | 1 | 480 Seconds** |
| II | 2 | 480 Seconds** |
| III | 1 | 480 Seconds** |
| III | 2 | 480 Seconds** |
| IV | 1 | 480 Seconds** |
| IV | 2 | 480 Seconds** |

**Failure had not occurred up to this point.
*Enamels are:
 I. AMOCO AI-235, polyamide-imide
 II. DuPont Type I ML, polyimide
 III. DuPont Type II ML, polyimide
 IV. Polyimide prepared according to Example 3.

The test set-up for the burnout test was devised similar to the set-up described by H. L. Emmons in the magazine INSULATION, September, 1967. A special low-voltage, high-current transformer with two identical secondaries was available. Each secondary can supply 2 volts at 1000 amperes. The output voltage is controllable by an induction regulator. A separate transformer and variable-voltage transformer were used to apply 500 volts between the twisted wires. A sensitive circuit breaker, rated at 0.75 amperes, was connected in the primary of the high potential transformer. A plastic cover was used to protect the sample from air current. To conduct a test, first the 500 volts was applied then the high-current transformer was turned on pre-set to about 55 amperes in each wire. The current decreased as the wires heated. The short-term failures occurred at about 40 amperes. The current stabilized at about 35 amperes in the long-term tests.

EXAMPLE 4

The Polymer system of Example 1 was mixed with a flow agent in the following manner: 100 ppm of a carboxypropyl terminated dimethyl siloxane polymer (DP = 10) was incorporated and the formulated material employed as an enamel to coat copper and aluminum wire in a conventional wire enameling tower. The coating was found to pass 25% elongation and 1-2× flexibility.

EXAMPLE 5

The polymer system of Example 1 was mixed with a "surfactant-flow agent" in the following manner: 100 ppm of a fluorocarbon surfactant was incorporated and the formulated material employed as an enamel to coat copper and aluminum wire in a conventional wire enameling tower. The coating was found to pass 25% elongation and 1-2× flexibility.

EXAMPLE 6

A polymer was prepared with the equipment described in Example 1, but by charging 1.01 moles of M to a solution of one mole of B. The polyamide polymer thus formed when applied to a copper wire and cured to the polyimide, did not pass the flexibility test, e.g., passed only 25% elongation and 4–5× flexibility.

EXAMPLE 7

A polymer prepared as described in Example 6 in a phenol-cresol solvent system, and with carboxyl propyl terminated dimethyl siloxane added as described in Example 4, did not have flexibility as above, i.e., it had only 25% elongation and 5×–6× flexibility on copper and aluminum wire coated in the conventional wire enameling tower.

EXAMPLE 8

246 gm. of NMP was charged to a reaction kettle equipped with agitation, nitrogen inlet and outlet, a thermometer, provision for controlled heating, and provision for withdrawal of water of condensation. To this was charged 33.4 gm. (.103 moles) of BPDA (B) with stirring. After a period of several minutes 10.3 gm. (.052 moles) of MDA (M) was added over a period of 5 minutes with stirring. After another period of several minutes the clear solution of BMB was raised in temperature to 98° C. and maintained for a period of 40 min. during which water of condensation was removed. The material, partially imidized BMB, was titrated for carboxylic acid and the present imidization found to be 18.4%. After cooling to 23° C., an additional 10.5 gm. (.053 moles) of MDA was added slowly to the contents of the reactor with stirring and the temperature maintained at less than 40° C. There was no observed water of condensation. The material was titrated for carboxylic acid and the present imidization found to be 9.2%. A 100 gm. sample of the product at about 18% solids was removed from the reaction kettle and treated with .5.0 ml. of conc. ammonia water. The resultant poly (ammonium orthoamate-imide) polymer solution could be reduced with water to any solids level, yielding a clear solution.

EXAMPLE 9

246 gm. of NMP was charged to a reaction kettle equipped with agitation, nitrogen inlet and outlet, a thermometer, provision for controlled heating, and provision for withdrawal of water of condensation. To this was charged 33.4 gm. (.103 moles) of BPDA (B) with stirring. After a period of several minutes 10.3 gm. (.052 moles) of MDA (M) was added over a period of 5 minutes with stirring. After another period of several minutes the clear solution of BMB was raised in temperature to 95° C. and maintained for a period of 100 min. during which water of condensation was removed. The material, partially imidized BMB, was titrated for carboxylic acid and the percent imidization found to be 24.2%. After cooling to 23° C., an additional 10.5 gm. of MDA were added slowly to the contents of the reactor with stirring and the temperature maintained at less than 40° C. There was no observed water of condensation. The material was titrated for carboxylic acid and the present imidization found to be 12.1%. The polyorthoamic acid-imide was analyzed for molecular weight with gel permeation chromatography, and the results are presented as Sample No. 3, in Table I. A 100 gm. sample of the product at about 18% solids was removed from the reaction kettle and treated with 5.0 ml. of conc. ammonia water. The resultant poly (ammonium orthoamate-imide) polymer solution could be reduced with water to any solids level, yielding clear solutions.

EXAMPLE 10

3000 gm. of NMP was charged to a Waring Blender under nitrogen. To this was added 541 gm. (1.680 moles) of BPDA. The blender was run for 25 sec. Then 166.3 gm. (0.840 moles) of MDA was added over a period of 15 sec. with stirring. After a period of several minutes, a second charge of 166.3 gm. (0.840 moles) of MDA was added over a period of two minutes with stirring. The resultant clear solution had a viscosity of 8300 cps. (at 23° C.) at 22.4% solids. On dilution to 19.0% solids with NMP the viscosity was 1820 cps. (at 23° C.). The percent imidization, calculated from a titration for the carboxylic acid content was 1.2±0.5%. This material was exposed to thermal treatment of 37.8° C. (100° F.) to evaluate change in kinematic viscosity with time. The measurements were made with the sample temperature at 23° C. The values over a 3 month period are shown in the following Table VI in comparison with commercially available polyimides made from the PMDA-ODA polymer. It is noted that commercially available enamels would arouse concern after about 25 days; they would be considered not fit for use in the conventional wire enameling towers at that time.

TABLE VI

Initial, intermediate and final kinematic viscosity measurements for enamels aged at 27.8° C. (100° F.) but measured at 23° C.

| | Initial* (cps) | 3 days (cps) | 27 days (cps) | 98 days (cps) | 122 days (cps) |
|---|---|---|---|---|---|
| Example 10 at 19.0% solids | 1820 | 1060 | 1150 | 1120 | 1200 |
| Example 10 with flow agent | 1675 | 1600 | 1550 | — | — |
| Type I, duPOnt | 2825 | 2600 | 3900 | 27,000 | 58,500 |
| Polyimide, 3M | 10,300 | 9550 | 12,200 | 29,500 | 32,800 |

*The initial viscosities are those at the time of entry into the 100° F. forced air oven. The Example 10 enamels are probably several weeks "fresher" than the commercially available enamels.

EXAMPLE 11

To a GE blender equipped with a dry nitrogen atmosphere was added a mixture of 48.7 ml. of N-methyl-2-pyrrolidone and 100 ml. of pyridine, followed by 20.8 gm. (0.105 moles) of p,p'-methylenedianiline. Then with vigorous agitation 32.2 gm. (0.100 moles) of 3,3'4,4'-benzophenonetetracarboxylic dianhydride was added over a period of approximately five minutes. After allowing the blender to run for approximately three minutes, $NH_3$ in the form of 6.0 ml of conc. ammonium hydroxide was added over a period of approximately one minute with continuous agitation. This was followed with addition of 93.3 ml. of distilled water. The resulting ammonium polyorthoamate polymer solution at 18.2% solids had a viscosity of about 220 cps. measured at 24° C.

A series of polyorthoamic acids and ammonium polyorthoamates was synthesized in this manner with single and dual organic solvents and with water present. This series is presented as Examples 12–22 in Table VII. Table VII illustrates the effect on shelf life of adding ammonia to form the ammonium polyorthoamate.

TABLE VII

| Ex. No. | Polymer raw materials | Solvent system | Solids % | Temp. (° C.) | Solution kinematic viscosity, cps., measurements at 23.5° C. | | | | | | |
|---|---|---|---|---|---|---|---|---|---|---|---|
| | | | | | 1 hr. | 24 hrs. | 4 days | 10 days | 16 days | 3 mos. | 5 mos. |
| 12 | BPDA—MDA | Pyr/water=2/3 | 17 | 23 | 247 | 810 | gelled | — | — | — | — |
| 13 | BPDA—MDA | Pyr/water=2/3 | 17 | 4 | 247 | 334 | 710 | gelled | — | — | — |
| 14 | BPDA—MDA—NH₃ (NH₃/COOH=0.25/1.00) | Pyr/water=2/3 | 17 | 23 | | | gelled | | — | — | — |
| 15 | BPDA—MDA—NH₃ (NH₃/COOH=0.50/1.00) | Pyr/water=2/3 | 17 | 23 | 218 | 286 | 553 | | | | 325 |
| 16 | BPDA—MDA—NH₃ (NH₃/COOH=0.50/1.00) | Pyr/water=2/3 | 17 | 4 | 218 | 227 | 305 | | | | 382 |
| 17 | BPDA—MDA—NH₃ (NH₃/COOH=1.00/1.00) | Pyr/water=2/3 | 17 | 23 | | 230 | 320 | | | | 350 |
| 18 | BPDA—MDA | NMP/Pyr/water=1/2/2 | 17 | 23 | 250 | — | gelled | | | | |
| 19 | BPDA—MDA—NH₃ (NH₃/COOH=0.25/1.00) | NMP/Pyr/H₂O=1/2/2 | 17 | 23 | 220 | — | — | gelled | | | |
| 20 | BPDA—MDA—NH₃ (NH₃/COOH=0.50/1.00) | NMP/Pyr/H₂O=1/2/2 | 17 | 23 | 220 | — | — | — | — | — | 290 |
| 21 | BPDA—MDA | NMP/water=3/1 | 22 | 23 | 99 | | | | 88 | gelled | |
| 22 | BPDA—MDA—NH₃ (NH₃/COOH=0.50/1.00) | NMP/water=3/1 | 22 | 23 | 450 | — | 750 | — | 500 | — | 420 |

EXAMPLE 23

A Regal mixer equipped with a cooling jacket was flushed with dry nitrogen, dewpoint −65° C. and charged with 1738 g. of dry N-methyl-2-pyrrolidone (<0.01% water), followed by 360 g. (1.818 moles), p,p'-methylene dianiline, (>99.7% purity). After stirring for about one minute, 293 g. (0.909 mole) 3,3',4,4'-benzophenonetetracarboxylic dianhydride, (>99.5% purity), was added with stirring over a period of 5 minutes and the stirring continued for 15 minutes forming the MBM precursor. The maximum temperature during this period was 35° C. The temperature was reduced to 25° C. and the precursor was further polymerized or "zipped up" by addition of 287 g. (0.891 mole) of 3,3',4,4'-benzophenonetetracarboxylic dianhydride, added slowly over a period of 15 min. with agitation, with the exotherm temperature rise controlled at a max. of 40° C., and the system eventually maintained at 25° C. After formation of the polymer, 220 g. of conc. ammonium hydroxide was added to the Regal with mixing. This was followed by the addition of 2000 g. of distilled water and the system stirred for about 30 min. The polymer system was treated with a "flow agent-surfactant" by adding 0.6% by total system weight of a conventional nonionic, nonylphenolethylene oxide adduct was incorporated. The resulting enamel was employed to coat copper and aluminum wire in a conventional wire enameling tower. The coating was found to pass 25% elongation and 1–2× flexiblity.

EXAMPLE 24

A Regal mixer equipped with a cooling jacket was flushed with dry nitrogen, dewpoint −65° C. and charged with 1738 g. of dry N-methyl-2-pyrrolidone (<0.01% water), followed by a mixture of 324 g. (1.636 moles) p,p'-methylene dianiline (>99.7% purity) and 36.5 g. (0.182 mole) p,p'-oxydianiline (>99.5% purity), for a total of 1.818 moles. After stirring for about one minute, 293 g. (0.909 mole) 3,3',4,4'-benzophenonetetracarboxylic dianhydride, (>99.5% purity), was added with stirring over a period of 5 minutes and the stirring continued for 15 minutes to form a precursor of the MBM type. The maximum temperature during this period was 35° C. The temperature was reduced to 25° C. and the precursor further polymerized or zipped up by the slow addition of 287 g. (0.891 mole) of 3,3',4,4'-benzophenonetetracarboxylic dianhydride, over a period of 15 min., with agitation, with the exotherm temperature rise controlled at a max. of 40° C. and the system eventually maintained at 25° C. After formation of the polymer, 220 g. of conc. ammonium hydroxide was added to the Regal mixer while mixing. This was followed by the addition of 2000 g. of distilled water and the system was stirred for about 30 min. Into the polymer system was incorporated 0.6% by total system weight of a conventional nonionic, nonylphenolethylene oxide adduct "flow agent-surfactant". The resulting enamel was employed to coat copper and aluminum wire in a conventional wire enameling tower. The coating was found to pass 25% elongation and 1–2× flexibility.

EXAMPLE 25

A Regal mixer equipped with a cooling jacket and a dry nitrogen atmosphere, was charged 2596 g. of a BMB precursor prepared in accordance with Example 1 at 29.2% solids and comprised of 1.800 moles of B and 0.900 mole of M. To this was added slowly and with stirring, over a period of 30 min., 2390 g. of an MBM precursor prepared in accordance with Example 23 at 27.3% solids and comprised of 1.818 moles of M and 0.909 mole of B. The mixing was continued for one hour, the exotherm controlled at a maximum of 45° C., and the polymer system eventually maintained at 25° C. This system was converted to the ammonium polyorthoamate according to Examples 1 and 23. The clear solution could be reduced to any solids level with water forming clear solutions.

By forming the precursor prepolymeric polyorthoamic acid materials in the initial molar ratio of two-to-one as described, I not only can control the degree of imidization, but also the purity, and the molecular weight an polydispersity as illustrated in Table I. I can further provide mixed polymers and thereby provide greater control over the properties of the polymer by controlling the polymer molecular weight within a narrow range and by utilizing partial imidization, I not only control the properties of the materials but also I minimize reactant stack loss other than by-products of the internal condensation reaction.

From the foregoing teaching it will be seen that I have produced a distinct intermediate polymer precursor. This compound can in turn be heat treated to effect the desired level of imidization which in turn determines the degree of viscosity of the coating material. By separately heat treating the intermediate polymer precursors I can effect the degree of imidization without depolymerization and a final polymeric product is obtainable with all the advantages set forth herein, including relatively higher molecular weights and lower degrees of polydispersity.

While I have emphasized the applicability of my coating process to the production of magnet wire insulation enamels, it will be appreciated that my invention is also useful in many other areas. For example, the films formed in accordance to my invention may find use in all high temperature insulation applications such as and rotor slot insulators, transformers, cable casings, capacitors, as well as in various laminating processes. In each case the coating composition affords a low-cost, high-class insulator or bonding agent that can be used in place of existing materials. Other potential uses of my process of forming water-borne coating solutions with or without minor modifications, will occur to those skilled in the art, and I intend, therefore, in the following claims, to cover all such equivalent variations as fall within the true spirit and scope of this invention.

I claim:

1. In a process for producing a high solids content polyamide acid solution for use in the preparation of a coating medium for applying a curable polyamide acid coating on magnet wire which includes the steps of reacting in a solvent an aromatic dianhydride reactant with an aromatic diamine reactant to produce a solution of a polyamide acid polymer wherein said reactants are present in approximately equal molar quantities, the improvement comprising:
   (a) forming an anhydrous mixture of an aromatic dianhydride reactant and an aromatic diamine reactant in an organic solvent wherein the reactants are in the molar ratio of about two-to-one;
   (b) reacting said reactants at a temperature below that at which imidization occurs to form an amide acid intermediate having two free carboxyl groups each ortho to an amide group;
   (c) partially imidizing said amide acid intermediate to an imidization level greater than a negligible amount up to but not more than 56% to provide the desired viscosity of the final polyamide acid polymer solution;
   (d) further reacting said amide acid intermediate with a reactant of the character of the original reactant initially present in the lesser amount with said additional reactant being in a molar amount equal to the molar amounts of said lesser initial reactant;
   (e) the total amounts of dianhydride reactant and diamine reactant being sufficient to produce a polyamide acid polymer solution having a solids content of between about 25% and about 70% by weight.

2. The process defined in claim 1 wherein said amide acid intermediate is partially imidized by heating the solution thereof to between about 90° C. and about 110° C. for a period of time sufficient to effect the desired degree of imidization.

3. The process of claim 1 wherein said aromatic dianhydride is of the general formula

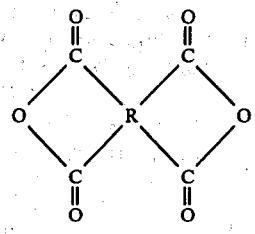

where R is a tetravalent radical containing at least one ring of six carbon atoms and having benzenoid unsaturation and with each pair of carboxyl groups being attached to different carbon atoms, and wherein said aromatic diamine is of the general formula $NH_2-R'-NH_2$ where R' is a divalent aromatic radical.

4. The process defined in claim 3 wherein said aromatic dianhydride is 3,3',4,4' benzophenonetetracarboxylic dianhydride.

5. The process defined in claim 3 wherein said aromatic diamine is p,p'-methylene dianiline.

6. The process defined in claim 1 wherein the initial reactants are in the molar ratio of two moles of aromatic diamine to one mole of aromatic dianhydride to form a stable amide acid intermediate material having two free carboxyl groups each ortho to an amide group and two terminal amine groups.

7. The process defined in claim 1 wherein the improvement further comprises the steps of adding ammonia to the high solids content organic solution of said polyamide acid polymer and thereafter further diluting said organic ammonium polyorthoamate solution with water to form a stable aqueous-organic coating medium having a solids content suitable for the intended coating application.

8. The process defined in claim 7 wherein the improvement further comprises the step of adding a flow promoting agent to the aqueous-organic coating medium.

9. The process in accordance with claim 1 in which said aromatic dianhydride is selected from the group consisting of 3,3',4,4' benzophenonetetracarboxylic dianhydride, pyromellitic dianhydride, and cyclopentane tetracarboxylic dianhydride and said aromatic diamine is selected from the group consisting of:
   m-phenylenediamine
   4,4'-oxydianiline
   4,4'-sulfonyldianiline
   4,4'-methylenedianiline
   4,4'-diamino-diphenyl sulfide
   3,3'-diamino-diphenyl sulfone
   4,4'-diamino-diphenyl ether
   2,6-diamino pyridine
   bis-(4 amino-phenyl) diethyl silane
   bis-(4 amino-phenyl) phosphine oxide
   bis-(4 amino-phenyl)-N-methylamine
   1,5-diamino naphthalene
   3,3'-dimethyl-4,4'-diamino-biphenyl
   3,3'-dimethoxy benzidine
   m-xylylene diamine
   p-xylylene diamine
   1,3-bis-delta amino butyltetramethyl disiloxane and
   1,3-bis-gamma-amino propyl tetraphenyl disiloxane and mixtures thereof.

10. The process in accordance with claim 1 wherein the reaction is carried out within an anhydrous organic solvent, said solvent having functional groups which are nonreactive with the reactants and being a solvent for at least one of said reactants.

11. The process of coating a substrate which comprises applying the polyamide acid produced according to the process defined in claim 1 to a substrate, and heating said coated substrate to cure said coating to the polyimide polymer form.

12. The process defined in claim wherein said coated substrate is heated to a temperature of between about 100° C. and about 500° C.

13. The process of claim 12 wherein the substrate is wire.

14. A substrate coated with a cured coating of coating material produced according to the process defined in claim 1.

15. Magnet wire coated with a cured coating of a coating material produced according to the process defined in claim 1.

16. A process for coating magnet wire with a polyamide acid coating comprising the steps of:
   (a) forming an anhydrous reaction mixture of an aromatic dianhydride type reactant and an aromatic diamine type reactant in an anhydrous solvent which is substantially inert to said reactants and wherein said reactants are in the molar ratio of about two-to-one;
   (b) reacting said reactants at a temperature below about 80° C. and for a period of time sufficient to form a prepolymeric reaction product;
   (c) partially imidizing said prepolymeric reaction product to an imidization level greater than a negligible amount up to but not more than 56% to provide the desired viscosity of the polyamide acid coating medium;
   (d) reacting said prepolymeric reaction product with a further amount of a reactant of the type of the one of said reactants which was present in the lesser amount in the reaction mixture, with said prepolymeric reaction product and said further reactant being in the molar ratio of about one-to-one, at a temperature of below about 80° C. to produce a solution of a polyamide acid reaction product having a solids content of between about 25% and about 70% by weight;
   (e) reacting said polyamide acid reaction product with a volatile ammonium base to render said reaction product water soluble;
   (f) adding water to said ammoniated reaction product in an amount sufficient to form an aqueous-organic solution thereof having a solids content suitable for the intended coating application;
   (g) adding to said aqueous-organic solution a flow control agent to form a coating medium; and
   (h) applying a coating of said coating medium to the magnet wire.

17. The coating process defined in claim 16 wherein said flow control agent is selected from the group consisting of:
   (a) a flow agent surfactant in the amount of between about 0.6% and about 0.6% and about 0.7% by weight of the coating medium,
   (b) a fluorocarbon surfactant in the amount of about 100 parts per million by weight of the coating medium,
   (c) a carboxypropyl terminated dimethyl siloxane polymer flow agent in the amount of 100 parts per million by weight of the coating medium, and
   (d) a mixture of cresylic acid-phenol blend in the amount of about 6% by weight of the coating medium, and n-butyl alcohol in the amount of about 6% by weight of the coating medium.

18. The coating process defined in claim 16 wherein the flow control agent is nonylphenoxypoly(ethyleneoxy)ethanol in the amount of between about 0.6% and about 0.7% by weight of the coating medium.

19. The coating process defined in claim 16 wherein the flow control agent is cresylic acid-phenol blend in the amount of 6% by weight of the coating medium and n-butyl alcohol in the amount of 6% by weight of the coating medium.

20. The coating process defined in claim 16 wherein the flow control agent is carboxypropyl terminated siloxane polymer in the amount of about 100 parts per million by weight of the coating medium.

21. The coating process defined in claim 16 wherein the flow control agent is fluorocarbon surfactant in the amount of about 100 parts per million by weight.

22. The coating process defined in claim 16 wherein said substrate is magnet wire.

23. The coating process defined in claim 22 wherein said magnet wire is copper wire.

24. The coating process defined in claim 22 wherein said magnet wire is aluminum wire.

25. The coating process defined in claim 16 wherein the polyamide acid reaction product is present in the coating medium in a concentration of between about 17% and about 22% solids by weight.

26. The coating process defined in claim 16 including the step of heating the coated substrate to a temperature and for a time sufficient to effect imidization of the polyamide acid coating.

27. The coating process defined in claim 16 wherein said temperature is between about 100° C. and about 500° C.

28. The coating process defined in claim 16 wherein the reaction temperature in steps (b) and (d) is below about 50° C.

29. The coating process defined in claim 16 wherein the maximum reaction temperature in step (b) is about 35° C. and the reaction temperature in step (d) is maintained between about 25° C. and about 45° C.

30. The coating process defined in claim 16 wherein said partial imidization is effected by heating said prepolymeric reaction product to a temperature between about 90° C. and about 110° C for a period of time sufficient to produce the desired level of imidization.

31. The coating process defined in claim 16 wherein said aromatic dianhydride reactant is 3,3',4,4'-benzophenonetetracarboxylic dianhydride and said aromatic diamine is p,p'-methylene dianiline.

32. The coating process defined in claim 30 wherein said aromatic dianhydride reactant is 3,3',4,4'-benzophenonetetracarboxylic dianhydride, said aromatic diamine is p,p'-methylene dianiline, said solvent is N-methyl-2-pyrrolidone, said reactants are initially reacted in the ratio of two moles 3,3',4,4'-benzophenonetetracarboxylic dianhydride and one mole p,p'-methylene dianiline, and said prepolymeric reaction product is heated at a temperature of about 95° C. for a period of about 100 minutes to partially imidize said product.

33. A stable amide acid intermediate composition for use in preparing a high solids content polyamide acid coating composition, comprising the reaction product of an aromatic diamine reactant and an aromatic dianhydride reactant in an anhydrous organic solvent, wherein the reactants are in the molar ratio of about two moles of one reactant to about one mole of the other and wherein said product is partially imidized to a level greater than a negligible amount up to but not more than 56% to provide the desired viscosity of the high solids content polyamide acid coating composition.

34. The intermediate composition defined in claim 33 wherein said aromatic dianhydride is of the general formula

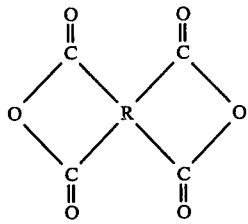

where R is a tetravalent radical containing at least one ring of six carbon atoms and having benzenoid unsaturation and with each pair of carboxyl groups being attached to different carbon atoms, and wherein said aromatic diamine is of the general formula $NH_2-R'-NH_2$ where R' is a divalent aromatic radical.

35. The intermediate composition defined in claim 33 wherein said aromatic dianhydride is 3,3',4,4' benzophenonetetracarboxylic dianhydride and said aromatic diamine is p,p'-methylene dianiline.

36. The intermediate composition defined in claim 33 wherein the initial reactants are in the molar ratio of two moles of aromatic diamine to one mole of aromatic dianhydride to form a stable amide acid intermediate material having two free carboxyl groups each ortho to an amide group, and two terminal amine groups.

* * * * *